(12) United States Patent
Ogikubo

(10) Patent No.: US 10,466,674 B2
(45) Date of Patent: Nov. 5, 2019

(54) PROGRAMMABLE LOGIC CONTROLLER SYSTEM, AND ENGINEERING TOOL COMPUTER PROGRAM PRODUCT

(71) Applicant: Mitsubishi Electric Corporation, Tokyo (JP)

(72) Inventor: Yu Ogikubo, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/322,975

(22) PCT Filed: Apr. 24, 2017

(86) PCT No.: PCT/JP2017/016233
§ 371 (c)(1),
(2) Date: Feb. 4, 2019

(87) PCT Pub. No.: WO2018/198174
PCT Pub. Date: Nov. 1, 2018

(65) Prior Publication Data
US 2019/0204803 A1 Jul. 4, 2019

(51) Int. Cl.
*G06F 19/00* (2018.01)
*G05B 19/05* (2006.01)

(52) U.S. Cl.
CPC .......... *G05B 19/056* (2013.01); *G05B 19/05* (2013.01); *G05B 19/054* (2013.01)

(58) Field of Classification Search
CPC ..... G05B 19/056; G05B 19/05; G05B 19/054
See application file for complete search history.

(56) References Cited

U.S. PATENT DOCUMENTS 7,725,663 B2 * 5/2010 Bullman ............. G06F 12/1483
711/147
9,092,647 B2 * 7/2015 Circello .................. G06F 21/74
(Continued)

FOREIGN PATENT DOCUMENTS

JP 8-179991 A 7/1996
JP 11-305807 A 11/1999
(Continued)

OTHER PUBLICATIONS

Yau, Ken, et al. "Detecting anomalous behavior of PLC using semi-supervised machine learning." 2017 IEEE Conference on Communications and Network Security (CNS). IEEE, 2017. (Year: 2017).*
(Continued)

*Primary Examiner* — Michael D Masinick
(74) *Attorney, Agent, or Firm* — Xsensus, LLP

(57) ABSTRACT

A programmable logic controller of a programmable logic controller system includes: a communication section that enables communication with an external instrument; a control processing section that executes a control program and executes a process associated with a request received by the communication section; and a data storage section that stores computation data that are handled in a process associated with execution of the control program. A peripheral instrument of the programmable logic controller system includes a setting processing section that defines, in the data storage section, a first area in which writing associated with the request is enabled and a second area in which writing associated with the request is prohibited based on an input operation including variables that are targets of control by the control program.

7 Claims, 7 Drawing Sheets

(56) References Cited

U.S. PATENT DOCUMENTS

| | | | | |
|---|---|---|---|---|
| 2009/0138729 | A1* | 5/2009 | Hashimoto | G06F 12/1416 |
| | | | | 713/193 |
| 2013/0145164 | A1* | 6/2013 | Nagai | H04L 9/0816 |
| | | | | 713/171 |
| 2016/0062954 | A1* | 3/2016 | Ruff | G06F 17/21 |
| | | | | 715/249 |

FOREIGN PATENT DOCUMENTS

| | | |
|---|---|---|
| JP | 2010-277143 A | 12/2010 |
| JP | 2014-71862 A | 4/2014 |
| JP | 2014-099014 A | 5/2014 |

OTHER PUBLICATIONS

Shen, Chia, et al. "User Level Scheduling of Communicating Real-Time Tasks." IEEE Real Time Technology and Applications Symposium. 1999. (Year: 1999).*

International Search Report dated Jul. 11, 2017 for PCT/JP2017/016233 filed on Apr. 24, 2017, 7 pages including English translation.

Notification of reasons for refusal received for Japanese Patent Application No. 2017-563355, dated Mar. 6, 2018, 6 pages including English translation.

Decision to Grant a Patent received for Japanese Patent Application No. 2017-563355, dated Jul. 17, 2018, 4 pages including English translation.

* cited by examiner

| | | WRITE-PROHIBITED RANGE | |
|---|---|---|---|
| TYPE | SYMBOL | HEAD | LAST |
| INPUT RELAY | X | 1000 | 1500 |
| OUTPUT RELAY | Y | 100 | 250 |
| INTERNAL RELAY | M | | |
| ... | ... | ... | ... |

WRITE-PROHIBITING SETTING

PROGRAMMABLE LOGIC CONTROLLER SYSTEM, AND ENGINEERING TOOL COMPUTER PROGRAM PRODUCT

CROSS-REFERENCE TO RELATED APPLICATIONS

The present application is based on PCT filing PCT/JP2017/016233, filed 24 Apr. 2017, the entire contents of each of which being incorporated herein by reference.

FIELD

The present invention relates to a programmable logic controller system including a programmable logic controller and a peripheral instrument, a programmable logic controller, and an engineering tool program.

BACKGROUND

A programmable logic controller (PLC) is communicably connectable to an external instrument, e.g., a display device, a computer, or another PLC, so that it can receive a write request command from the external instrument. In accordance with a write request from an external instrument, the PLC may execute the process of writing to a data area in which computation data are stored. The PLC needs to protect important computation data stored in the data area from being falsified by a malicious third party or being rewritten due to an erroneous operation.

Patent Literature 1 discloses a PLC-related technique for setting, in a memory for storing computation data, an area in which writing of data associated with a request from. an external instrument is prohibited. The PLC can protect computation data stored in the write-prohibted area. According to the technique of Patent Literature 1, the write-prohibited area is designated using the address of the memory.

CITATION LIST

Patent Literature

Patent Literature 1: Japanese Patent Application Laid-open No. 8-179991

SUMMARY

Technical Problem

It as desirable that the setting for defining an area in which writing of data associated with communication from an external instrument is prohibited separately from an area in which writing is enabled be simple and easy to understand for the user who configures the settings.

The present invention has been made in view of the above circumstances, and an object thereof is to obtain a programmable logic controller system capable of defining a write-prohibited area with simple and easy-to-understand settings.

Solution to Problem

In order to solve the above problems and achieve the object, a programmable logic controller system according to the present invention includes a programmable logic controller and a peripheral instrument connected to the programmable logic controller. The programmable logic controller includes: a communication section that enables communication. with an external instrument; a control processing section that executes a control program. and executes a process associated with a request received by the communication section; and a data storage section that stores computation data that are handled in a process associated with execution of the control program. The peripheral instrument includes a setting processing section that defines, in the data storage section, a first area in which writing associated with the request is enabled and a second area in which writing associated with the request is prohibited based on an input operation including variables that are targets of control by the control program.

Advantageous Effects of Invention

The programmable logic controller system according to the present invention can achieve the effect of defining a write-prohibited area with simple and easy-to-understand settings.

DESCRIPTION OF EMBODIMENTS

Hereinafter, a programmable logic controller system, a programmable logic controller, and an engineering tool program according to embodiments of the present invention will be described in detail with reference to the drawings. The present invention is not limited to the embodiments.

First Embodiment

Figure 1:
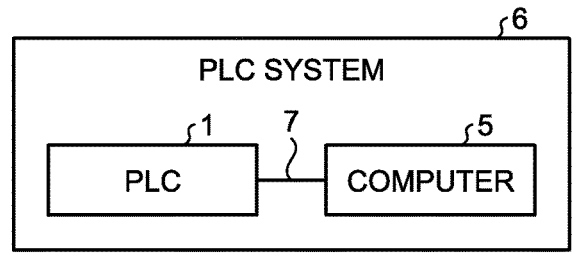
FIG. 1 is a diagram illustrating a PLC system according to a first embodiment of the present invention.

FIG. 1 is a diagram illustrating a PLC system 6 according to the first embodiment of the present invention. The PLC system 6 includes: a PLC 1; and a computer 5 which is a peripheral instrument connected to the PLC 1. The computer 5 is a personal computer with an engineering tool program installed thereon. A network cable 7 communicably connects the PLC 1 and the computer 5. One example of the network cable 7 is a local area network (LAN) cable. The computer 5 creates project data including a control program to be executed by the PLC 1, and transmits the created project data to the PLC 1.

By executing the control program, the PLC 1 controls driving of a control target machine. The machine is a manufacturing device, a machining device, or a facility device, and may be any device for use in a factory automation (FA) system. The FA system is a system for automating the production process in the factory. The PLC 1 can also receive a write request command from an external instrument by being communicably connected to the external instrument. In FIG. 1, illustrations of an external instrument and a control target machine are omitted. The operation of the PLC 1 in response to receiving a write request command from an external instrument will be described later.

Figure 2:
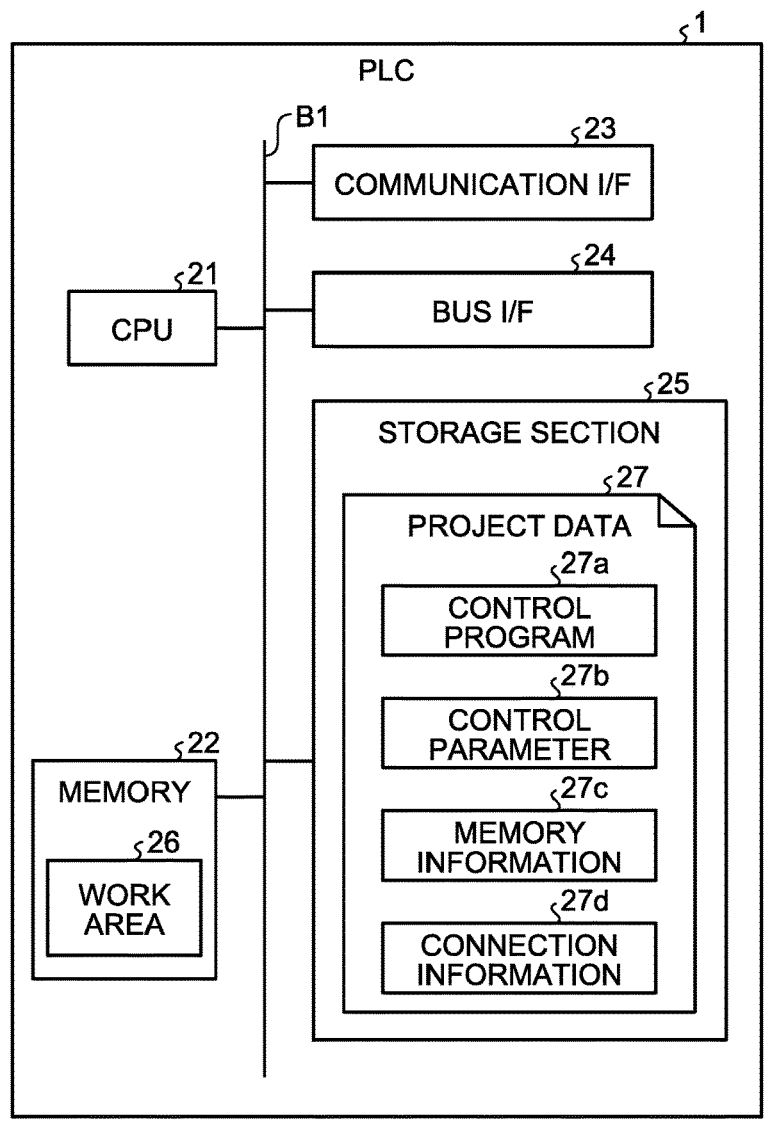
FIG. 2 is a block diagram illustrating a hardware configuration of the PLC illustrated in FIG. 1.

FIG. 2 is a block diagram illustrating a hardware configuration of the PLC 1 illustrated in FIG. 1. The PLC 1 includes: a central processing unit (CPU) 21; a memory 22; a communication interface (I/F) 23; a bus interface (I/F) 24; and a storage section 25. The components of the PLC 1 are connected to one another via an internal bus B1.

The communication I/F 23 is an interface for connection with an external instrument and the computer 5 illustrated in FIG. 1. The bus I/F 24 is a bus bridge circuit that links the internal bus Bi to an expansion bus. A control target machine is connected to the expansion bus. In FIG. 2, illustration of the expansion bus is omitted.

The storage section 25, which is an external storage device, stores project data 27 received from the computer 5. The storage section 25 is a solid state drive (SSD) or a hard disk drive (HDD). The project data 27 include a control program 27a, a control parameter 27b, memory information 27c, and connection information 27d.

The control parameter 27b is a parameter that is referred to during the execution of the control program 27a. The memory information 27c is information in which regulations on the data area for each computation data in a work area 26 in the memory 22 are described. Computation data are handled in a computation process by the control program 27a, and include data output from a control target machine, internal data of the machine, and internal data of the PLC 1. The connection information 27d is information for defining the connection relationship between the PLC 1 and the machine.

In the first embodiment, the control program 27a is a ladder program described in a ladder language. The control program 27a may be a program described in a language other than a ladder language, and may be a program described in a structured ladder language or a program described in a function block diagram language.

The memory 22 is a random access memory (RAM). The control program 27a is loaded into the memory 22. The CPU 21 develops the control program 27a in the program storage area in the memory 22 to execute various processes. The memory 22 includes the work area 26 which is a data storage area for the execution of various processes. In the work area 26, a plurality of data areas defined by the memory information 27c are secured. Each data area stores computation data that are handled in a computation process.

Figure 3:
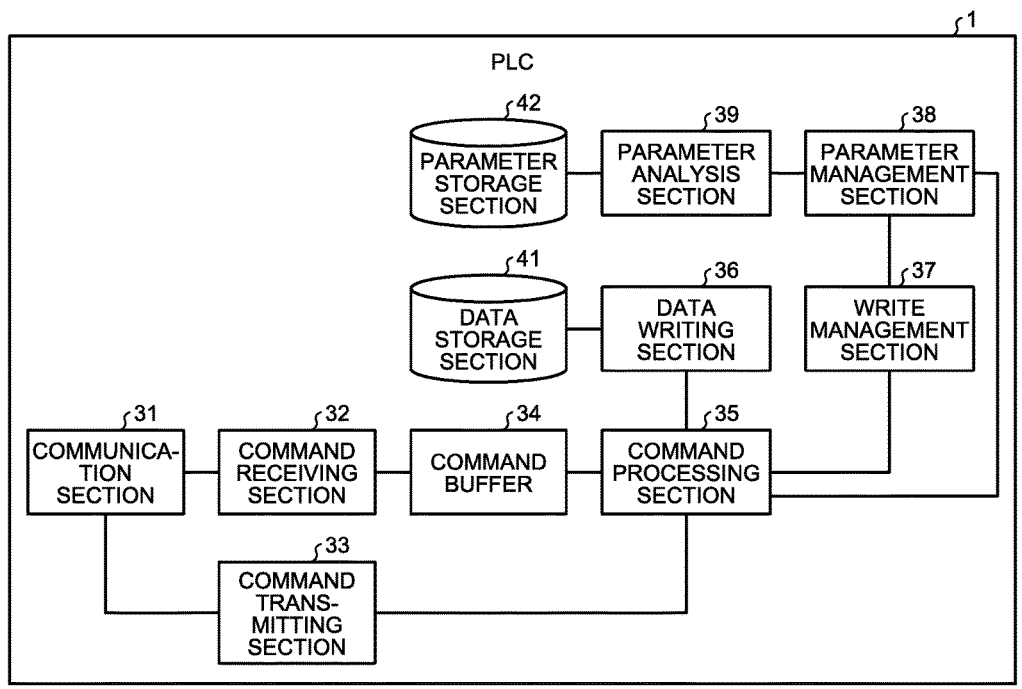
FIG. 3 is a block diagram illustrating a functional configuration of the PLC illustrated in FIG. 1.

FIG. 3 is a block diagram illustrating a functional configuration of the PLC 1 illustrated in FIG. 1. FIG. 3 illustrates functional sections related to processing a wrote request from an external instrument. The PLC 1 includes a communication section 31 and a command processing section 35. The communication section 31 is a functional section for enabling communication with an external instrument. The command processing section 35 is a control processing section. The command processing section 35 is a functional section for executing the control program 27a illustrated in FIG. 2 and executing a process associated with a request received by the communication section 31.

The PLC 1 further includes a data storage section 41 and a parameter storage section 42. The data storage section 41 stores computation data that are handled in a process by the control program 27a. The parameter storage section 42 stores a parameter file set for the operation of the command processing section 35. The parameter storage section 42 stores a parameter file created by the computer 5. In one example, the parameter file contains a parameter for designating the operation mode of the PLC 1. The parameter file also contains a parameter indicating an area of the data storage section 41 in which writing of data associated with a request from an external instrument is prohibited. The function of the data storage section 41 is realized by using the memory 22 illustrated in FIG. 2. The function of the parameter storage section 42 is realized by using the storage section 25 illustrated in FIG. 2.

The communication section 31 includes a network interface for communication between the PLC 1 and an external instrument. In the first embodiment, the network interface is a universal serial bus (USB). The communication section 31 receives a write request command from an external instrument. The communication I/F 23 illustrated in FIG. 2 has the function of the communication section 31.

A command receiving section 32 executes the process of receiving a command received by the communication section 31, and stores the command in a command buffer 34. The command buffer 34 temporarily stores a command from the command receiving section 32, and sends the command to the command processing section 35 using the first-an first-out (FIFO) method.

The command processing section 35 sequentially processes commands received from the command buffer 34. A command transmitting section 33 creates a response frame regarding the result of processing a command by the command processing section 35, and executes the process of transmitting the response frame. The communication section 31 transmits the response frame to the external instrument. The functions of the command receiving section 32, the command transmitting section 33, and the command processing section 35 are realized by using the CPU 21 illustrated in FIG. 2.

A write management section 37 analyzes a command input to the command processing section 35. Based on a parameter read from the parameter storage section 42, the write management section 37 manages writing to the data storage section 41 by determining whether to permit or reject writing through the execution of a write request command. If the write management section 37 determines to permit writing, the command processing section 35 executes the command. In accordance with an instruction from the command processing section 35, a data writing section 36 executes the process of writing to the data storage section 41. In contrast, if the write management section 37 determines to reject writing, the command processing section 35 stops executing the command and executes an error process. The functions of the data writing section 36 and the write management section 37 are realized by using the CPU 21 illustrated in FIG. 2.

A parameter analysis section 39 analyzes a parameter read from the parameter storage section 42 and confirms the consistency of the parameter. A parameter management section 38 holds the parameter analyzed by the parameter analysis section 39, and provides the held parameter to the command processing section 35 and the write management section 37. The write management section 37 acquires, from the parameter management section 38, the parameter concerning the setting of an area in which writing of data is prohibited. The function of the parameter analysis section 39 is realized by using the CPU 21 illustrated in FIG. 2. The function of the parameter management section 38 is realized by using the memory 22 illustrated in FIG. 2.

Figure 4:
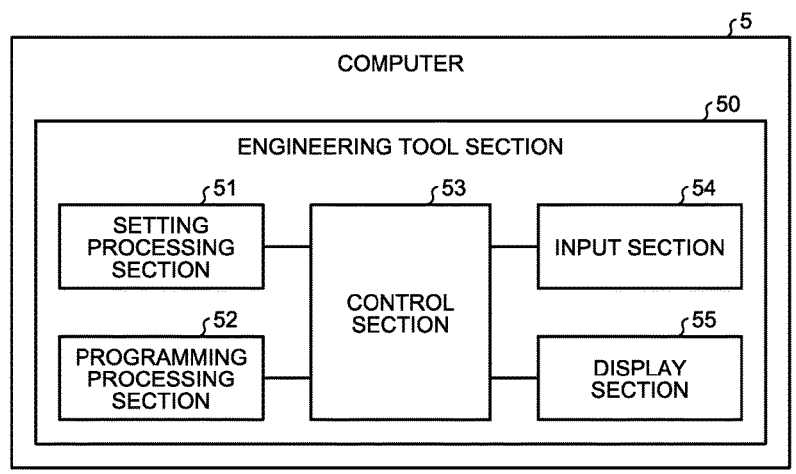
FIG. 4 is a block diagram illustrating a functional configuration of the computer illustrated in FIG. 1.

FIG. 4 is a block diagram illustrating a functional configuration of the computer 5 illustrated in FIG. 1. The computer 5 includes an engineering tool section 50. The engineering tool section 50 is realized by executing an engineering tool program on the hardware of the computer 5.

The engineering tool section 50 includes a setting processing section 51. Based on an input operation including variables that are targets of control by the control program 27a, the setting processing section 51 as a functional section causes the data storage section 41 illustrated in FIG. 3 define: a first area in which writing associated with a request from an external instrument is enabled; and a second area in which writing associated with a request from an external instrument is prohibited. In the first embodiment, the setting processing section 51 executes the process of setting the second area based on an input operation including the designation of the second area. The setting processing section 51 sets the second area to define the second area and the first area which is the area other than the second area.

The engineering tool section 50 further includes a programming processing section 52, an input section 54, and a display section 55. The programming processing section 52 a functional section for creating the project data 27 illustrated in FIG. 2. The input section 54 is a functional section for accepting an input operation by the user. The display section 55 is a functional section for displaying information on operation at the engineering tool section 50. The input section 54 accepts an input operation for creating the project data 27 in the programming processing section 52 and an input operation for setting the second area by the setting processing section 51. A control section 53 is a functional section for controlling each section of the engineering tool section 50.

Figures 5, 6:
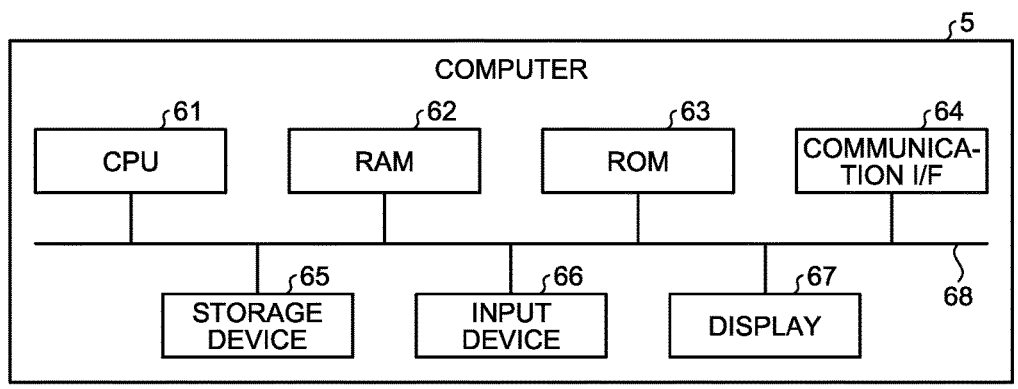
FIG. 5 is a block diagram illustrating a hardware configuration of the computer illustrated in FIG. 1.
FIG. 6 is a diagram illustrating an example of a screen for setting a second area in the setting processing section illustrated in FIG. 4.

FIG. 5 is a block diagram illustrating a hardware configuration of the computer 5 illustrated in FIG. 1. The computer 5 includes: a central processing unit (CPU) 61 that executes various processes; a RAM 62 including a program storage area and a data storage area; a read only memory (ROM) 63 that is a non-volatile memory; and a communication interface (I/F) 64 that is an interface for connection with the PLC 1. The computer 5 further includes: a storage device 65 that is an external storage device for storing data; an input device 66 that accepts an input operation by the user; and a display 67 that displays information using various screens. The components of the computer 5 illustrated in FIG. 5 are connected to one another via a bus 68. The storage device 65 is an HDD or an SSD. The input device 66 is a pointing device and a keyboard. One example of the display 67 is a liquid crystal display with a liquid crystal panel.

The CPU 61 executes programs stored in the ROM 63 and the storage device 65. The ROM 63 stores, therein, basic input/output system (BIOS) or unified extensible firmware interface (UEFI), which is a program for controlling the basic operation of the computer 5. The storage device 65 stores, therein, an operating system program and an engineering tool program that are executed by the computer 5.

Programs stored in the ROM 63 and the storage device 65 are loaded into the RAM 62. The CPU 61 develops programs in the program storage area in the RAM 62 to execute various processes. It should be noted that the engineering tool program may be stored in a storage medium readable by the computer 5. The computer 5 may store the engineering tool program stored in the storage medium in the storage device 65. The storage medium may be a portable storage medium which is a flexible disk or a flash memory which is a semiconductor memory. The engineering tool program may be installed from another computer or a server device to the computer 5 over a communication network.

Next, the setting of the second area by the PLC system 6 will be described. FIG. 6 is a diagram illustrating an example of a screen 56 for setting the second area in the setting processing section 51 illustrated in FIG. 4. The display section 55 illustrated in FIG. 4 displays the screen 56 for input operations including variables that are targets of control by the control program 27a.

Below is a description of variables used for setting the second area. In the first embodiment, the ladder program which is the control program 27a illustrated in FIG. 2 includes a plurality of circuit blocks. A circuit block is formed by combining a condition part and an operation part. A condition part is a group of circuits including contacts connected in series or in parallel. An operation part is a group of circuits including one or more coils connected in series. An operation part represents the contents of a computation process that is executed when the contacts of a condition part are electrically connected together.

A program code created in a ladder language includes circuit symbols and variables which are basic components. Circuit symbols include contacts and coils representing processes in the PLC 1. Variables are targets of control on the control program 27a and represents targets of processes indicated by circuit symbols. A variable is described using a combination of an alphabet representing the type of component and a numeral for identifying the component. Variables are associated with the respective data areas of the work area 26 illustrated in FIG. 2. In each data area, computation data for each component are stored. Computation data include bit data expressing the distinction between on and off and word data expressing numerical values. The user can freely assign numerals included in variables for each processing target. Note that a variable used in the programming of the ladder program or a data area associated with a variable may also be referred to as a "device". Computation data stored in the data area associated with a variable may also be referred to as a "device value".

On the screen 56 illustrated in FIG. 6, the title of "write-prohibiting setting" indicating that it is a screen for setting the second area is displayed. On the screen 56, designation of a variable range is input for each type of component, so that the second area can be set for each component. In the column of "type" displayed on the screen 56, the type names of components are described. In the column of "symbol", alphabets which are symbols representing types are described. The names described in the column of "type" and the alphabets described in the column of "symbol" are preset. In the column of "write-prohibited range", the range of the data area to be the second area can be designated using a range of numerals included in variables. The range of the data area to be the second area is designated by a numeral representing the head variable of the range and a numeral representing the last variable of the range. In the column of "head", numerals representing the head variables of ranges are entered. In the column of "last", numerals representing the last variables of ranges are entered. In this manner, the screen 56 can accept the input of variables indicating the ranges of second areas.

In the example illustrated in FIG. 6, "1000" and "1500" are respectively entered in the "head" column and the "last" column for "input relay" which is one of the component types. This input indicates that the range of the data area to be the second area for "input relay" is designated in the range of X1000 to X1500. In response to the setting of the second area, the setting processing section 51 defines the second area in the range of X1000 to X1500 in the data area allocated to "input relay". The setting processing section 51 defines the first area in the range of X0 to X999 and the range of X1501 to the end, which are the ranges other than the range of X1000 to X1500in the data area allocated to "input relay".

The setting processing section 51 also defines the second area in the range of Y100 to Y250 in the data area allocated to "output relay". The setting processing section 51 defines the first area in the range of Y0 to Y99and the range of Y251 to the end, which are the ranges other than the range of Y100 to Y250 in the data area allocated to "output relay". In this manner, the setting processing section 51 accepts an input operation including variables on the screen 56, thereby defining the first area and the second area.

In the example illustrated in FIG. 6, the "head" and "last" columns for "internal relay" are not filled. The fact that the "head" and "last" columns are not filled indicates that the second area is not set for "internal relay". Regarding the data area allocated to "internal relay", the setting processing section 51 leaves the entire area allocated to "internal relay" as the first area without providing the second area.

On the screen 56, the number of ranges of the second area that can be set for each type of component is not limited to one. On the screen 56, a plurality of ranges to be the second area may be set for each type of component.

The user enters a range of variables to the screen 56 by an input operation for the input device 66. In one example, the user who is the subject of input operations is a person engaged in programming by using the engineering tool program.

The setting processing section 51 converts information input to the screen 56 into a parameter of a format interpretable by the CPU 21 illustrated in FIG. 2. The computer 5 transmits the parameter obtained through conversion in the setting processing section 51 to the PLC 1 via the communication I/F 64 illustrated in FIG. 5. The write management section 37 illustrated in FIG. 3 stores the parameter received from the PLC n the parameter storage section 42. As a result, the PLC system 6 sets the second area in the data area of the data storage section 41.

In the PLC system 6, the user enables input operations for defining the first area and the second area by using variables used in the programming of the control program 27a. The user can inhibit computation data in a freely-selected variable range handled by the control program from being rewritten according to a request from an external instrument. The user can freely set the range of the second area in the data area in view of the importance of computation data for each variable. The PLC 1 can protect computation data stored in the second area from being erroneously or deliberately rewritten by an operator who handles an external instrument. As input operations using variables are enabled, the PLC system 6 can set the first area and the second area with simple and easy-to-understand settings for the user who performs programming, as compared with a case where the address of the memory 22 illustrated in FIG. 2 is required for area setting.

Next, the operation of the PLC 1 in which the second area is set will be described. The parameter management section 38 illustrated in FIG. 3 reads out the parameter representing the range of the second area from the parameter storage section 42 and holds the read out parameter. When a command from an external instrument is input to the command processing section 35, the write management section 37 analyzes the contents of the command. The write management section 37 also reads out the parameter indicating the range of the second area from the parameter management section 38. Based on the head position of writing in the data area and the size of data to be written, the write management section 37 determines whether the region associated with the write request is included in the range of the second area.

Figure 7:
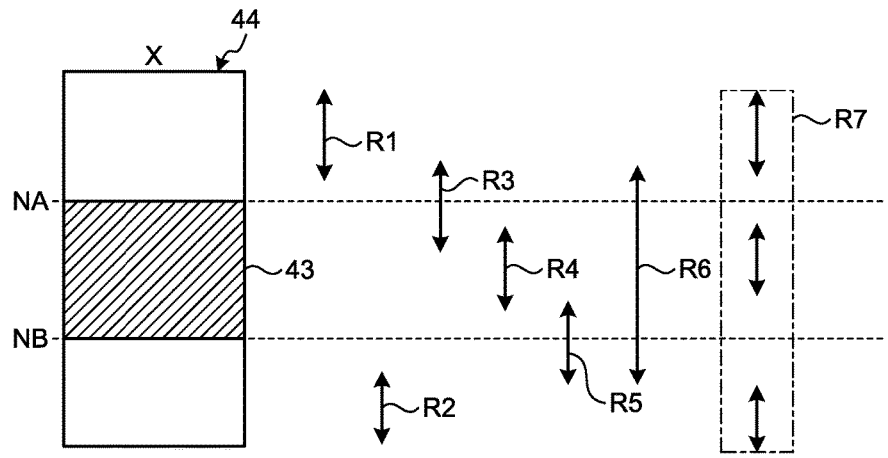
FIG. 7 is a diagram for explaining determination by the write management section illustrated in FIG. 3.

FIG. 7 is a diagram for explaining determination by the write management section 37 illustrated in FIG. 3. The example illustrated in FIG. 7 is based on the premise that a second area 43 is set in the range of XNA to XNB in a data area 44 concerning "X" that is a component of the ladder program. Note that XNA and XNB are variables indicating the part of the data area 44 defined with numbers of "NA" and "NB". The work area 26 illustrated in FIG. 2 includes the data area 44 concerning "X" and the data area concerning the other components of the ladder program. In FIG. 7, the data area 44 in the work area 26 is represented in association with numbers attached to variables.

Regions R1 to R7 represent examples of regions associated with write requests. Both the regions R1 and R2 are out of the second area 43 in their entirety. The write management section 37 permits a write process when writing to the region R1 or R2 is requested. The region R4 included in the second area 13 in its entirety. The write management section 37 rejects a write process when writing to the region R4 is requested.

The write management section 37 rejects a write process not only when the region associated with a write request is included in the second area 43 in its entirety but also when the region is partially included in the second area 43. Each of the regions R3, R5, and R6 is partially included in the second area 43. The write management section 37 rejects a write process when writing to the region R3, R5, or R6 is requested. The region R7 includes three divisions, and one of the three divisions is included in the second area 13. The write management section 37 rejects a write process when writing to the region R7 is requested by one command.

Figure 8:
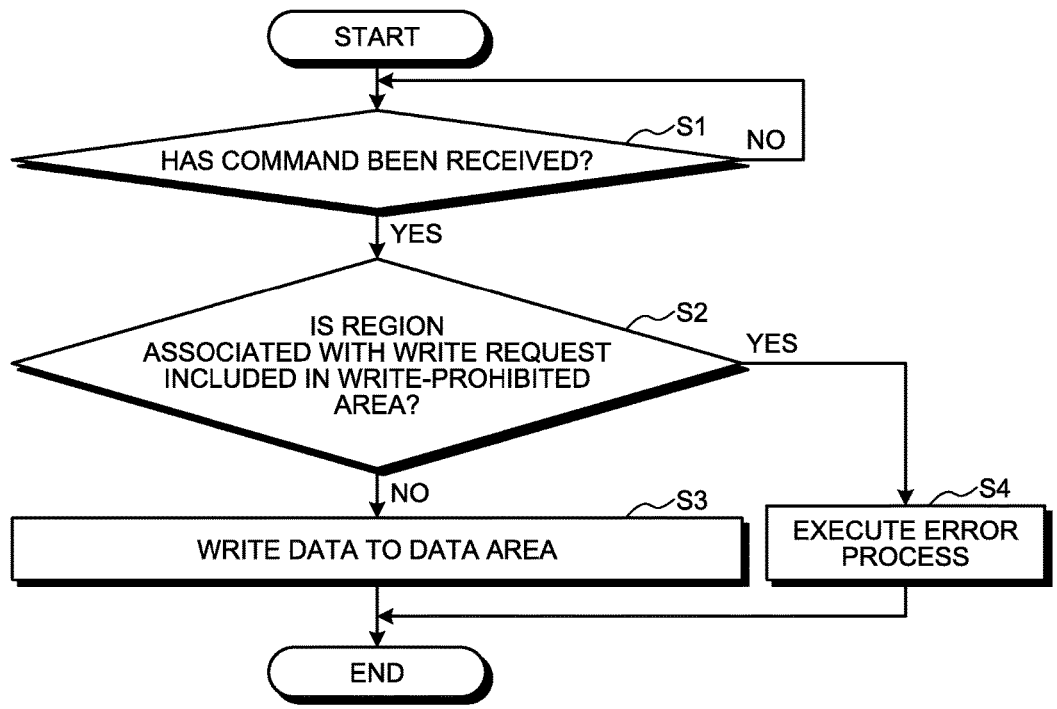
FIG. 8 is a flowchart illustrating the procedure for the operation of the PLC triggered by a write request from an external instrument in the first embodiment.

FIG. 8 is a flowchart illustrating the procedure for the operation of the PLC 1 triggered by a write request received from an external instrument in the first embodiment. In step S1, the write management section 37 determines whether a command has been received by the PLC 1. The write management section 37 monitors the command input from the command buffer 34 to the command processing section 35, and determines that a command has been received in response to the command being input to the command processing section 35. If it is determined that the PLC 1 has not received a command (step S1: No), the write management section 37 waits until a command is received.

If it is determined that the PLC 1 has received a command (step S1: Yes), the write management section 37 analyzes the command input to the command processing section 35. In step S2, the write management section 37 determines whether the whole or a part of the region associated with the write request is included in the second area which is a write-prohibited area.

If it is determined that the whole or a part of the region associated with the write request is not included in the second area (step S2: No), the write management section 37 determines to permit writing. The command processing section 35 executes the command in response to receiving the determination of write permission.

Upon execution of the command in the command processing section 35, the data writing section 36 writes data to the data area of the data storage section 41 in step S3. The command transmitting section 33 creates a response frame indicating that data have been successfully written upon execution of the command in the command processing section 35, and executes the process of transmitting the response frame. The communication section 31 transmits the response frame to the external instrument.

On the other hand, if it is determined that the whole or a part of the region associated with the write request is included in the second area (step S2: Yes), the write management section 37 determines to reject writing. The command processing section 35 stops executing the command in response to receiving the determination of write rejection. In step S4, the command processing section 35 executes an error process. The command transmitting section 33 creates a response frame indicating that data writing has been rejected upon execution of the error process in the command processing section 35, and executes the processing of transmitting the response frame. The communication section 31 transmits the response frame to the external instrument. As a result, the PLC 1 ends the operation triggered by receiving the write request from the external instrument.

It should be noted that the setting processing section 51 does not necessarily set the data area to be the second area using a range of variables. The setting processing section 51 may pinpoint variables, instead of setting a range of variables. The first area and the second area may be defined through the setting of the first area, instead of the setting of the second area by the setting processing section 51. The setting processing section 51 may execute the process of setting the first area based on an input operation including designation of the first area. The setting processing section 51 sets the first area to define the first area and the second area which is the area other than the first area.

Variables for use in input operations on the screen 56 are not limited to variables for used in programming the ladder program. Variables may be variables for used in programming a program other than the ladder program. In one example, variables may be "labels" which are variables for used in structured programming. The user can assign freely-selected names, or "labels", for each processing target. The setting processing section 51 can set the data area to be the second area by setting according to a range of "labels" or pinpointing "labels".

Figure 9:
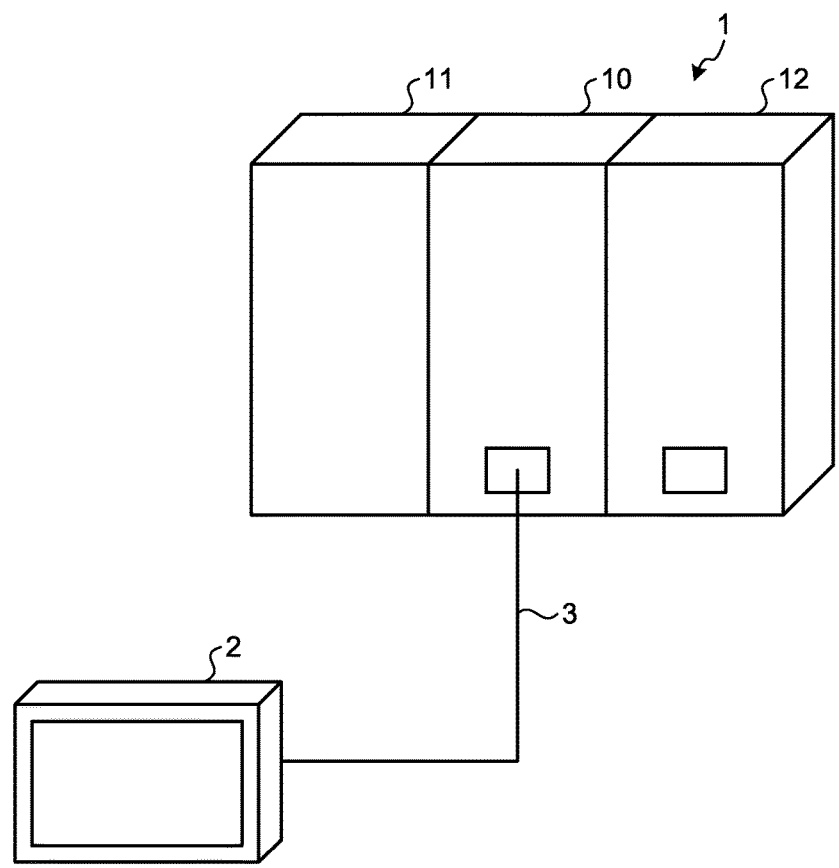
FIG. 9 is a diagram illustrating an example of the PLC illustrated in FIG. 1 and an external instrument connected to the PLC.

Next, connection between the PLC 1 and an external instrument will be described. FIG. 9 is a diagram illustrating an example of the PLC 1 illustrated in FIG. 1 and an external instrument connected to the PLC 1. The PLC 1 illustrated in FIG. 9 includes: a control unit 10 that executes input/output control and computation processes, a power supply unit 11 that supplies power to each unit of the PLC 1, and a communication unit 12 that performs communication via a network. In one example, the communication unit 12 communicates with another PLC connected to the network. The configuration illustrated in FIGS. 2 and 3 is provided in the control unit 10. In the parameter storage section 12, a parameter indicating the second area is stored.

The units of the PLC 1 are connected to one another via a base unit including a built-in bus. In FIG. 9, illustration of the base unit is omitted. The PLC 1 may include units other than the units illustrated in FIG. 9.

The PLC 1 may include an input unit for receiving information from a control target and an output unit for transmitting information to a control target according to an instruction from the control unit 10.

A display device 2, which is an external instrument, is connected to the control unit 10 by a USB cable 3. The display device 2 transmits a write request command to the PLC 1. The command includes information indicating the position of the head of the region. associated with the write request and information indicating the size of data to be written. The communication section 31 illustrated in FIG. 3 receives the command transmitted through the USP cable 3. The write management section 37 determines whether the whole or a part of the region associated with the write request is included in the second area which is a write-prohibited area.

If it is determined that the whole or a part of the region associated with the write request is not included in the second area, the PLC 1 executes writing of data according to the request from the display device 2. If it is determined that the whole or a part of the region associated with the write request is included in the second area, the PLC 1 does not execute writing of data according to the request from the display device 2, but executes an error process.

The PLC 1 may receive a write request command from an external instrument other than the display device 2. An external instrument may be a computer capable of communicating with the PLC 1 or another PLC.

According to the first embodiment, the PLC system 6 can define the first area and the second area in the PLC 1 by using variables that are targets of control by the control program 27a. The PLC system 6 can achieve the effect of enabling input operations with variables to define the first area and the second area with simple and easy-to-understand settings for the user who performs programming.

Note that the PLC 1 does not necessarily receive a write request command from an external instrument connected via the USB interface. The PLC 1 may receive a write request command from an external instrument connected via a network interface other than the USB interface. The second and third embodiments each relate to a case where the PLC 1 receives a write request command from an external instrument connected via a network interface other than the USB interface.

Second Embodiment

Figure 10:
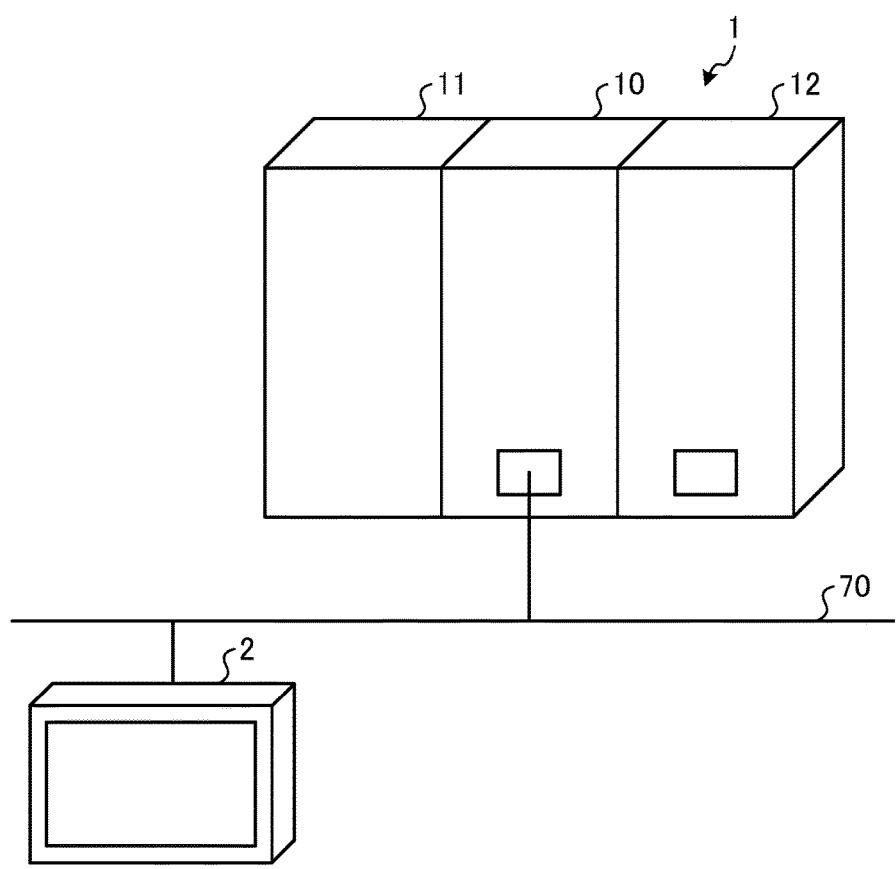
FIG. 10 is a diagram illustrating a PLC included in a PLC system according to a second embodiment of the present invention.

FIG. 10 is a diagram illustrating the PLC 1 included in the PLC system 6 according to the second embodiment of the present invention. FIG. 10 illustrates an example of the PLC 1 and the display device 2 which is an external instrument connected to the PLC 1. Components identical to those in the first embodiment are denoted by the same reference signs, and duplicate explanation is omitted.

The control unit 10 and the display device 2 which is an external instrument are connected to each other via a LAN network 70. In one example, the LAN network 70 is a network based on Ethernet (registered trademark). The communication section 31 illustrated in FIG. 3 includes an Ethernet interface which is a network interface. An arbitrary communication standard can be applied as the communication standard for the LAN network 70.

The display device 2 transmits a write request command to the PLC 1. The command includes information indicating the position of the head of the region associated with the write request and information indicating the size of data to be written. The command also includes an internet protocol (IP) address which is identification information for specifying the PLC 1 as the destination of the write request. The communication section 31 receives the command transmitted through the LAN network 70.

The PLC 1 may receive a write request command from an external instrument other than the display device 2. An external instrument may be a computer capable of communicating with the PLC 1 or another PLC. In the second embodiment, when receiving a write request command from an external instrument connected to the LAN network 70, the PLC 1 can protect computation data stored in the second area from being rewritten.

Third Embodiment

Figure 11:
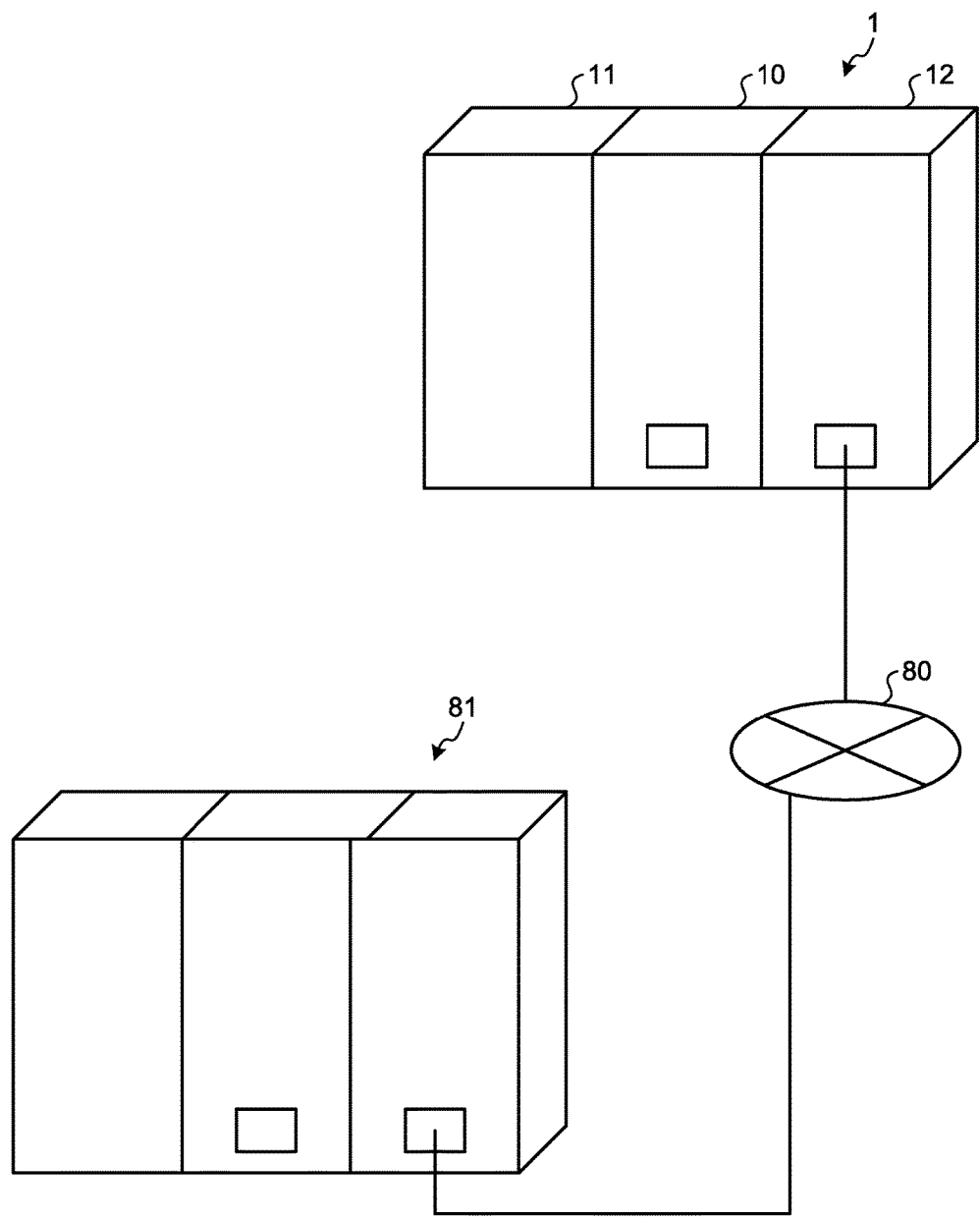
FIG. 11 is a diagram illustrating a PLC included in a PLC system according to a third embodiment of the present invention.

FIG. 11 is a diagram illustrating the PLC 1 included in the PLC system 6 according to the third embodiment of the present invention. FIG. 11 illustrates an example of the PLC 1 and a PLC 81 which is an external instrument connected to the PLC 1. Components identical to those in the first embodiment are denoted by the same reference signs, and duplicate explanation is omitted.

The communication unit 12 of the PLC 1 and the PLC 81 are connected to each other via an industrial network 80. In one example, the industrial network 80 is a CC-Link (registered trademark) network. The industrial network 80 may be an industrial network other than the CC-Link network. The industrial network 80 may be a communication network based on RS-232 which is a serial interface. In addition, the industrial network 80 may include communication between a plurality of hierarchies between a master station and local stations.

In the PLC 1, the control unit 10 manages the communication unit 12. The communication unit 12 includes a network interface that corresponds to the industrial network 80. The CPU of the PLC 81 transmits a write request command to the communication unit 12. In FIG. 11, illustration of the CPU of the PLC 81 is omitted. The command includes information indicating the position of the head of the region associated with the write request and information indicating the size of data to be written. The command also includes identification information according to the communication protocol of the industrial network 80. Using the identification information, the communication unit 12 of the PLC 1 that is the destination of the write request is specified on the industrial network 80. The communication unit 12 receives the command transmitted through the industrial network 80. The identification information may include a network number set for each hierarchy of communication and a station number representing the communication unit 12 that is the destination of the write request.

Upon receiving the command from the industrial network 80, the communication unit 12, via the base unit, transmits the received command to the control unit 10 that manages the communication unit 12. In FIG. 11, illustration of the base unit is omitted. The communication section 31 illustrated in FIG. 3 receives the command from the communication unit 12.

In the third embodiment, when receiving a write request command from an external instrument connected to the industrial network 80, the PLC 1 can protect computation data stored in the second area from being rewritten. Even when a write request command is received by a unit other than the control unit 10 in which writing of data associated with a request from an external instrument is prohibited, the PLC 1 can protect computation data stored in the control unit 10 from being rewritten.

The configuration described in the above-mentioned embodiments indicates an example of the contents of the present invention. The configuration can be combined with another well-known technique, and a part of the configuration can be omitted or changed in a range not departing from the gist of the present invention.

REFERENCE SIGNS LIST 1, 81 PLC; 2 display device; 3 USB cable; 5 computer; 6 PLC system; 7 network cable; 10 control unit; 11 power supply unit; 12 communication unit; 21, 61 CPU; 22 memory; 23, 64 communication I/F; 24 bus I/F; 25 storage section; 26 work area; 27 project data; 27a control program; 27b control parameter; 27c memory information; 27d connection information; 31 communication section; 32 command receiving section; 33 command transmitting section; 34 command buffer; 35 command processing section; 36 data writing section; 37 write management section; 38 parameter management section; 39 parameter analysis section; 41 data storage section; 42 parameter storage section; 43 second area; 44 data area; engineering tool section; 51 setting processing section; 52 programming processing section; 53 control section; 54 input section; 55 display section; 56 screen; 62 RAM; 63 ROM; 65 storage device; 66 input device; 67 display; 68 bus; 70 LAN network; 80 industrial network.

The invention claimed is:

1. A programmable logic controller system comprising:
a programmable logic controller; and
a peripheral instrument connected to the programmable logic controller, wherein
the programmable logic controller includes:
   communication circuitry to enable communication with an external instrument;
   control processing circuitry to execute a control program and execute a process associated with a request received by the communication circuitry; and
   a data storage memory including a plurality of data areas to store computation data that are handled in a process associated with execution of the control program; and
   a parameter storage memory to store a parameter file set for operation of the control processing circuitry,
the peripheral instrument includes:
   programing processing circuitry to create the control program according to an input operation for inputting variables that are targets of control by the control program; and
   setting processing circuitry to define, in the data storage memory, a first area in which writing associated with the request is enabled and a second area in which writing associated with the request is prohibited based on an input operation to input a head variable of a data area to be the first area or the second area and a last variable of the data area to designate the data area, and
   the setting processing circuitry converts the input variable into a parameter interpretable by the control processing circuitry, and stores the parameter obtained through conversion in the parameter storage memory to define the first area and the second area.

2. The programmable logic controller system according to claim 1, wherein
the peripheral instrument further comprises a display to display a screen for the input operation to designate the data area.

3. The programmable logic controller system according to claim 1, wherein
the programmable logic controller comprises write management circuitry to manage writing to the data storage memory by determining whether to permit or reject a write process associated with the request based on a range of the data area that is the defined first area or the defined second area.

4. The programmable logic controller system according to claim 3, wherein,
the parameter file includes the parameter that is information of the range, and
the write management circuitry determines whether to permit or reject the write process based on the parameter read from the parameter storage memory.

5. The programmable logic controller system according to claim 1, wherein
the setting processing circuitry executes a process of setting the second area based on the input operation including designation of the data area to be the second area to define the second area and the first area that is an area other than the second area.

6. The programmable logic controller system according to claim 1 wherein
the variable is a combination of a symbol representing a type of component in the control program and a number for identifying the component, and
the setting processing circuitry defines the first area and the second area in response to input of the symbol, the number representing a head variable of the range of the first area or the second area, and the number representing a last variable of the range.

7. A non-transitory computer readable medium including an engineering tool program that causes a computer to execute creation of a control program based on input of variables that are targets of control by a control program, the control program being executed by a programmable logic controller, wherein the engineering tool program causes the computer to execute:
a first step of displaying a screen for an input operation for inputting a head variable of a data area to be a first area in which writing associated with a request from an external instrument is enabled or a second area in which writing associated with the request is prohibited and a last variable of the data area to designate the data area; and
a second step of defining, based on the input operation, the first area and the second area in a plurality of data areas to store computation data that are handled in a process associated with execution of the control program,
wherein the second step converts the input variable into a parameter interpretable by the programmable logic controller, and stores the parameter obtained through conversion to define the first area and the second area.

* * * * *